(12) United States Patent
Lahr et al.

(10) Patent No.: US 10,850,602 B2
(45) Date of Patent: Dec. 1, 2020

(54) HYBRID POWERTRAIN ENGINE DISCONNECT DEVICE

(71) Applicant: GM GLOBAL TECHNOLOGY OPERATIONS LLC, Detroit, MI (US)

(72) Inventors: Derek F. Lahr, Howell, MI (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 16/002,863

(22) Filed: Jun. 7, 2018

(65) Prior Publication Data

US 2019/0375286 A1   Dec. 12, 2019

(51) Int. Cl.
| | |
|---|---|
| *B60K 6/383* | (2007.10) |
| *F16D 41/16* | (2006.01) |
| *F16D 41/14* | (2006.01) |
| *F16D 41/12* | (2006.01) |
| *B60K 6/48* | (2007.10) |
| *F16H 45/02* | (2006.01) |

(52) U.S. Cl.
CPC ............ *B60K 6/383* (2013.01); *F16D 41/14* (2013.01); *F16D 41/16* (2013.01); *B60K 2006/4825* (2013.01); *F16D 41/125* (2013.01); *F16H 2045/0294* (2013.01)

(58) Field of Classification Search
CPC ............ B60K 6/20–547; B60K 6/383; F16D 41/12–16; Y10S 903/913
See application file for complete search history.

(56) References Cited

U.S. PATENT DOCUMENTS

| | | | | |
|---|---|---|---|---|
| 5,789,823 | A * | 8/1998 | Sherman | F16H 61/62 290/47 |
| 5,931,271 | A * | 8/1999 | Haka | B60K 6/26 192/48.92 |
| 7,198,587 | B2 | 4/2007 | Samie et al. | |
| 7,258,214 | B2 * | 8/2007 | Pawley | F16D 41/16 192/43.1 |
| 8,029,403 | B2 | 10/2011 | Lee et al. | |
| 8,123,656 | B2 * | 2/2012 | Schoenek | B60K 6/383 477/5 |
| 8,298,105 | B2 * | 10/2012 | Kajigai | B60K 6/365 475/35 |

(Continued)

FOREIGN PATENT DOCUMENTS

DE   102014209620 A1 * 12/2014   ............ B60K 6/387

*Primary Examiner* — Ernesto A Suarez
*Assistant Examiner* — James J Taylor, II
(74) *Attorney, Agent, or Firm* — Reising Ethington P.C.

(57) ABSTRACT

A hybrid vehicle and a powertrain for a hybrid vehicle are disclosed. A hybrid powertrain may include an internal combustion engine configured to provide rotational power to a rotatable shaft in a first rotational direction, and an electric motor-generator configured to selectively provide rotational power to a rotational output. The motor-generator may include a rotor fixed for rotation with the rotational output. The powertrain may further include an engine disconnect device comprising a mechanical clutch linking the rotatable shaft with the rotational output. More specifically, the rotatable shaft may drive the rotational output in the first rotational direction, and the rotational output may freewheel with respect to the rotatable shaft when rotating faster in the first rotational direction than the rotatable shaft.

13 Claims, 5 Drawing Sheets

(56) References Cited

U.S. PATENT DOCUMENTS

| | | | | |
|---|---|---|---|---|
| 8,920,275 B2* | 12/2014 | Reitz | ............... | B60K 6/383 |
| | | | | 475/5 |
| 9,108,615 B2* | 8/2015 | Lee | ............... | B60W 10/02 |
| 9,605,605 B2* | 3/2017 | Ideshio | ............... | B60K 6/48 |
| 10,179,582 B2* | 1/2019 | Ortmann | ............... | B60K 6/383 |
| 10,183,566 B2* | 1/2019 | Trent | ............... | B60K 6/387 |
| 10,193,445 B2* | 1/2019 | Suekawa | ............... | B60W 20/00 |
| 10,518,626 B2* | 12/2019 | Pettersson | ............... | B60K 6/48 |

* cited by examiner

HYBRID POWERTRAIN ENGINE DISCONNECT DEVICE

INTRODUCTION

Hybrid vehicles typically employ an electric motor-generator in addition to an internal combustion (IC) engine for selectively providing motive force to a final drive unit of the vehicle. Hybrid vehicles may rely upon the electric motor-generator and IC engine to varying degrees. In other words, some hybrid vehicles rely primarily upon the IC engine to supply power to the final drive unit, while other hybrid vehicles are driven primarily or even exclusively by the electric motor-generator (while the IC engine either recharges batteries supplying electrical power to the electric motor-generator or supplies additional driving power for the vehicle when demanded).

Hybrid vehicles typically need to disconnect the IC engine and/or electric motor-generator from rotating components of the vehicle, e.g., when the IC engine and/or motor-generator is/are not actively supplying power to the vehicle. Wet disconnect clutches are commonly used to separate rotating components of a powertrain in this context. However, wet disconnect clutches are typically relatively bulky, and relatively slow and/or imprecise in the engagement/disengagement of rotating components.

Accordingly, there is a need for an improved powertrain for a vehicle that addresses the above problems.

SUMMARY

Example illustrations are directed to a hybrid vehicle and a powertrain for a hybrid vehicle. In at least one example, a hybrid powertrain for a vehicle may include an internal combustion engine configured to provide rotational power to a rotatable shaft in a first rotational direction, and an electric motor-generator configured to selectively provide rotational power to a rotational output. The motor-generator may include a rotor fixed for rotation with the rotational output. The powertrain may further include an engine disconnect device comprising a mechanical clutch linking the rotatable shaft with the rotational output. More specifically, the rotatable shaft may drive the rotational output in the first rotational direction, and the rotational output may freewheel with respect to the rotatable shaft when rotating faster in the first rotational direction than the rotatable shaft.

In some examples of a hybrid powertrain, the mechanical clutch is a selectable one-way clutch that links the rotatable shaft with the rotational output such that the rotatable shaft freewheels with respect to the rotational output when rotating faster than the rotational output in the first rotational direction, and the selectable one-way clutch is configured to apply an engine braking force transmitted by the rotatable shaft to the rotational output.

Where the mechanical clutch is a selectable one-way clutch, the selectable one-way clutch may have a selector plate configured to selectively actuate the selectable one-way clutch. In some examples the selector plate may actuate the selectable one-way clutch between a first configuration that is forward-locked and reverse-locked, and a second configuration that is forward-locked and reverse-freewheel. Optionally, a selectable one-way clutch may include at least one clutch disc having a plurality of engagement elements disposed within engagement element cavities of the clutch disc, the engagement elements pivotable between a locked position and a freewheel position. In these examples, the clutch disc may optionally be configured to drive a corresponding rotatable disc in the first rotational direction when the engagement elements are in the locked position. In at least some examples, the engagement elements are pivotable about an axis perpendicular to an axis of rotation of the clutch disc.

In some examples, the engine disconnect device includes a disc clutch linking the rotatable shaft and the rotational output such that the engine is configured to apply an engine braking force to the rotational output using the rotatable shaft when the disc clutch is engaged. In these examples, the mechanical clutch may be a one-way clutch.

In at least some example approaches, the mechanical clutch is a mechanical diode.

The rotational output of the hybrid powertrain may be a rotational input for a torque converter, e.g., a torque converter cover.

Example illustrations of a hybrid vehicle may include a final drive unit driving at least one vehicle wheel and a powertrain providing motive force to the final drive unit. In examples of a hybrid vehicle, the powertrain may include an internal combustion engine configured to provide rotational power to a rotatable shaft in a first rotational direction, and an electric motor-generator comprising a rotor fixed for rotation with a torque converter rotational input, such that the electric motor-generator is configured to selectively provide rotational power to the torque converter rotational input. The powertrain may also include an engine disconnect device comprising a mechanical clutch linking the rotatable shaft with the torque converter rotational input such that the rotatable shaft drives the torque converter rotational input in the first rotational direction, and the torque converter rotational input freewheels with respect to the rotatable shaft when rotating faster in the first rotational direction than the rotatable shaft.

Continuing with the above example hybrid vehicle, the mechanical clutch may optionally be a selectable one-way clutch linking the rotatable shaft with the torque converter rotational input such that the rotatable shaft freewheels with respect to the torque converter rotational input when rotating faster than the torque converter rotational input in the first rotational direction, and the selectable one-way clutch is configured to apply an engine braking force transmitted by the rotatable shaft to the rotational output. Optionally, a selectable one-way clutch may include a selector plate configured to selectively actuate the selectable one-way clutch. In some examples the selector plate may actuate the selectable one-way clutch between a first configuration that is forward-locked and reverse-locked, and a second configuration that is forward-locked and reverse-freewheel. In at least some examples, a selectable one-way clutch includes at least one clutch disc having a plurality of engagement elements disposed within engagement element cavities of the clutch disc, with the engagement elements being pivotable between a locked position and a freewheel position. In some example approaches, the at least one clutch disc is configured to drive a corresponding rotatable disc in the first rotational direction when the engagement elements are in the locked position. Optionally, the engagement elements may be pivotable about an axis perpendicular to an axis of rotation of the clutch disc.

In some examples of a hybrid vehicle, the engine disconnect device includes a disc clutch linking the rotatable shaft and the torque converter rotational input such that the engine is configured to apply an engine braking force to the torque converter rotational input using the rotatable shaft when the disc clutch is engaged.

In at least some example approaches, the mechanical clutch of the hybrid vehicle is a mechanical diode.

Optionally, the final drive unit of the hybrid vehicle includes a rear axle of the vehicle.

In some example hybrid vehicles, the electric motor-generator may have a maximum voltage greater than 50 Volts (V).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

According to example illustrations herein, a hybrid vehicle or powertrain may employ a mechanical clutch as a disconnect device between an internal combustion (IC) engine and a rotational input to a torque converter of the vehicle. Mechanical clutches, for purposes of this disclosure, may include, but are not limited to, a mechanical diode, a one-way clutch, or a selectable one-way clutch. Example mechanical clutches are generally locked in a first rotational direction such that a first rotational element, e.g., a crankshaft or output shaft of an IC engine, drives a second rotational element such as a rotational input to a torque converter when the first rotational element is turning in the first rotational direction. Mechanical clutches also allow for freewheeling in a rotational direction opposite to the first direction. In other words, to any extent the second rotational element spins faster than the first rotational element, e.g., when an electric motor-generator is spinning the rotational input to the torque converter faster than the crankshaft/output shaft from the IC engine (e.g., when the IC engine is slowing down or shut off), the first rotational element does not significantly brake or drag the second rotational element. Moreover, when the speed of the first rotational element subsequently increases and reaches the same rotating speed as the second rotational element in the first rotational direction (e.g., when the engine is restarted or accelerated in speed due to demand by the driver), there is no discernible delay in the first rotational element engaging with and driving the second rotational element. In this manner, an IC engine may quickly and smoothly transition from a shutoff or idle state to actively providing motive force to the powertrain, and vice-versa. The lack of a delay is due to the mechanical clutch immediately passing rotational driving force on from the first rotational element to the second rotational element.

The lack of delay and relatively quick engagement/disengagement of mechanical clutches is distinguished from wet disconnect clutches typical of previous approaches in hybrid vehicles. A wet disconnect clutch generally relies upon hydraulic pressure that applies force between two rotational elements, and thus delays synchronization of rotational speeds of the first and second rotational elements while pressure and/or friction builds between the rotational elements sufficient to cause synchronization of the rotational speeds of each.

The relatively quicker engagement/disengagement of the mechanical clutch, by contrast, may generally improve drivability of the hybrid vehicle and make transitions between hybrid powertrain operating states less discernible to vehicle occupants. More specifically, drivability may be enhanced by a smoother engagement/disengagement of the IC engine during transitions between operating states of the powertrain, e.g., when the IC engine is transitioning from an operating state where the IC engine provides motive force to the powertrain at least in part, to an operating state where the IC engine is shut off entirely or otherwise not providing motive force to the powertrain. These advantages in drivability may be particularly beneficial where an electric motor-generator is relatively powerful or more often used to provide motive force to a vehicle final drive unit, as the IC engine may be relied upon to a lesser extent. As such, hybrid vehicles using larger or more powerful electric motor-generator units in combination with an example mechanical clutch as a disconnect device increase fuel efficiency by limiting use of the IC engine to a greater degree due to the increased power and usability of the electric motor-generator, while minimizing the intrusiveness or harshness of transitions between at least the operating states described above.

Figure 1A:
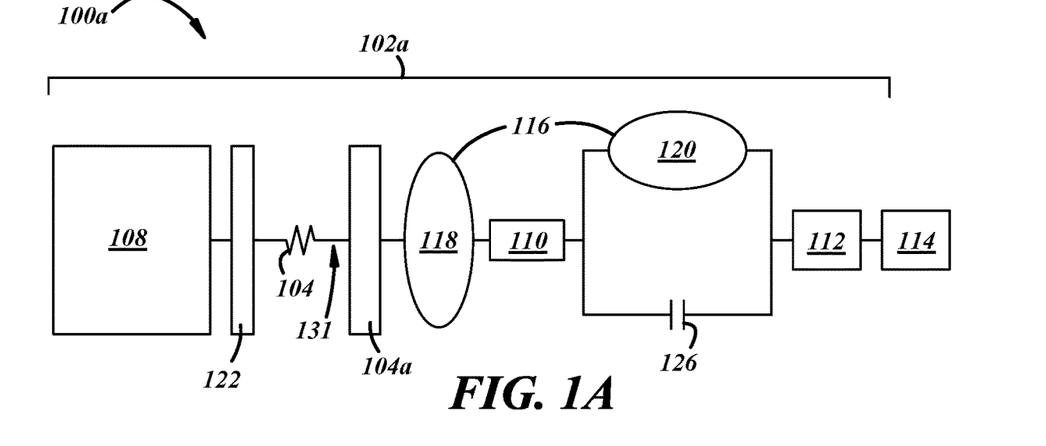
FIG. 1A is a lever diagram depicting a hybrid vehicle and powertrain having a mechanical clutch, according to one example approach.
Figure 1B:
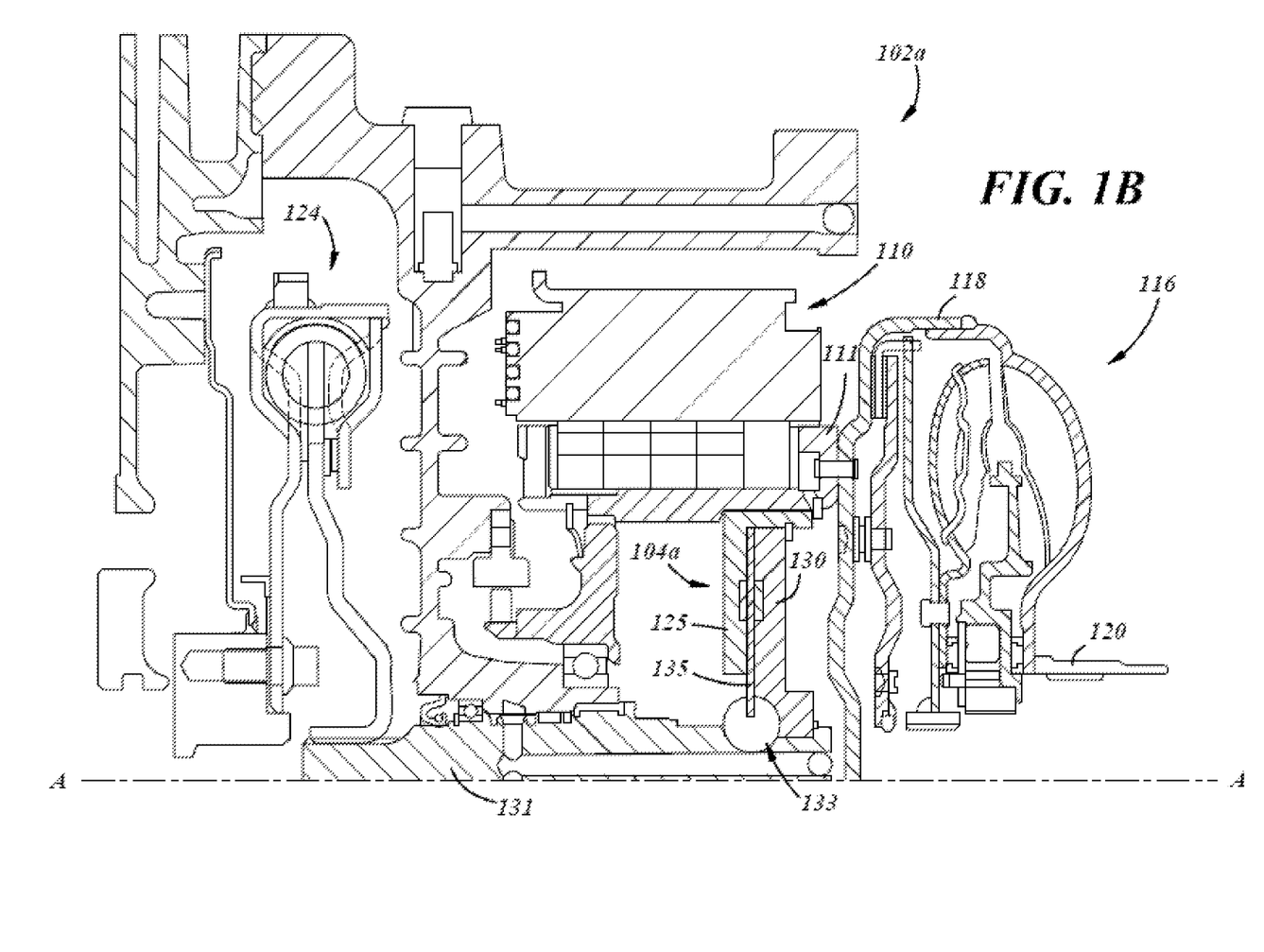
FIG. 1B is a partial section view of the powertrain of FIG. 1A, according to an example.
Figure 1C:
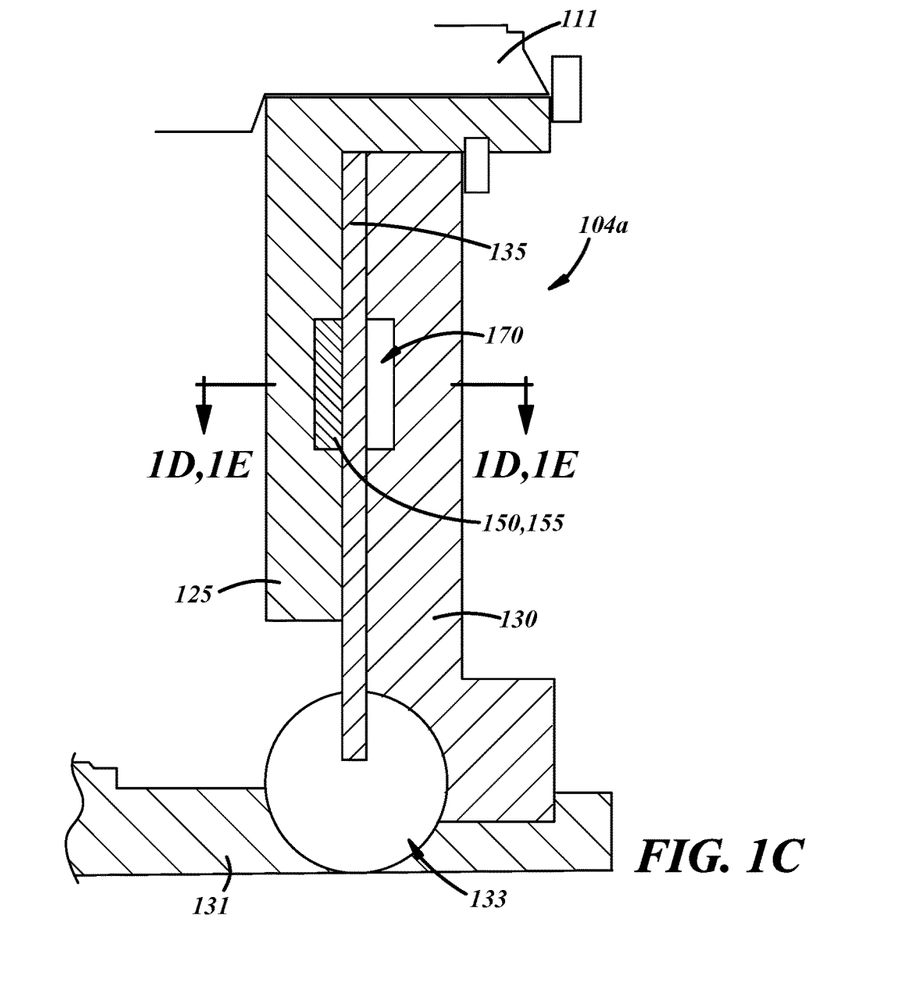
FIG. 1C is an example of an enlarged portion of the section view of the powertrain of FIGS. 1A and 1B.
Figure 1D:
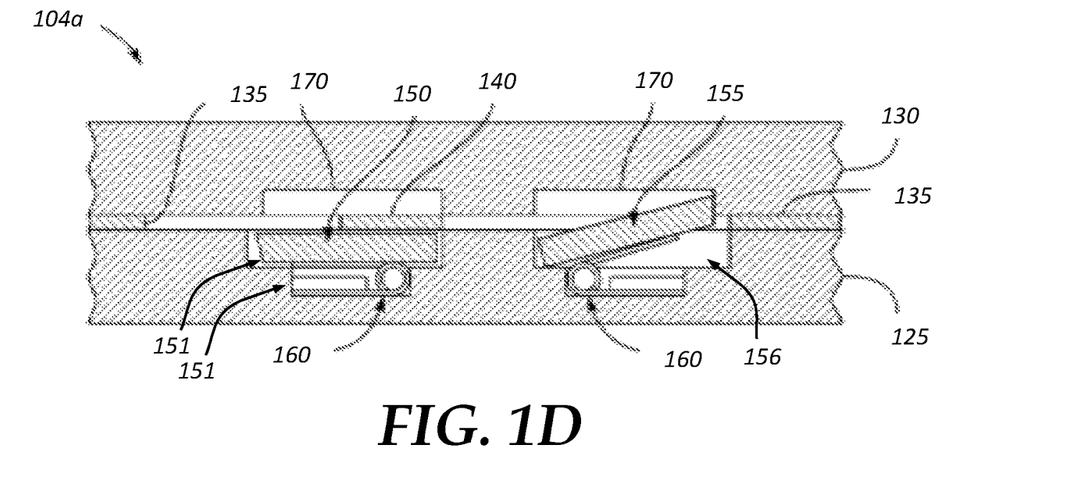
FIG. 1D is a fragmentary section view of the mechanical clutch of FIGS. 1A-1C in a first configuration, according to one example.
Figure 1E:
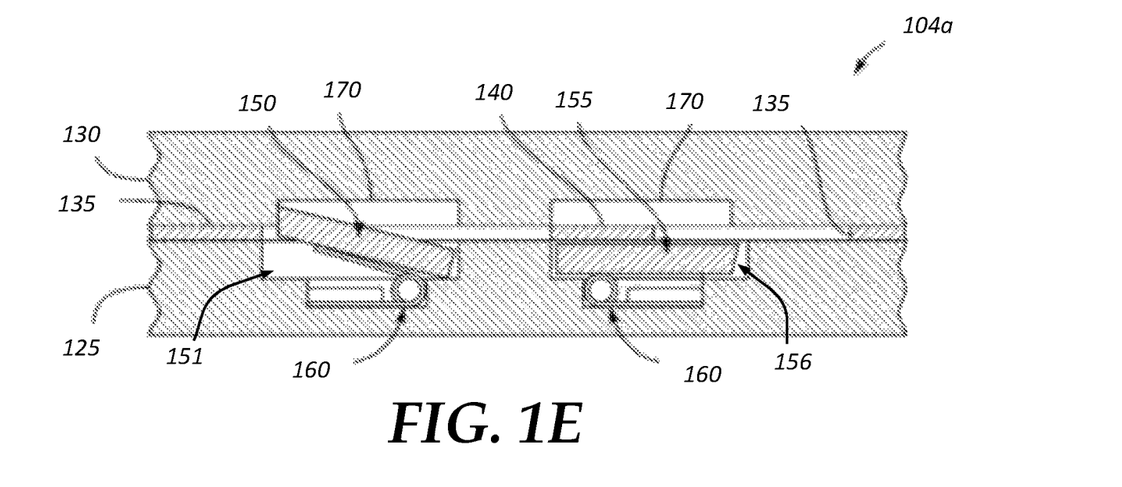
FIG. 1E is a fragmentary section view of the mechanical clutch of FIGS. 1A-1D in a second configuration, according to one example.
Figure 2A:
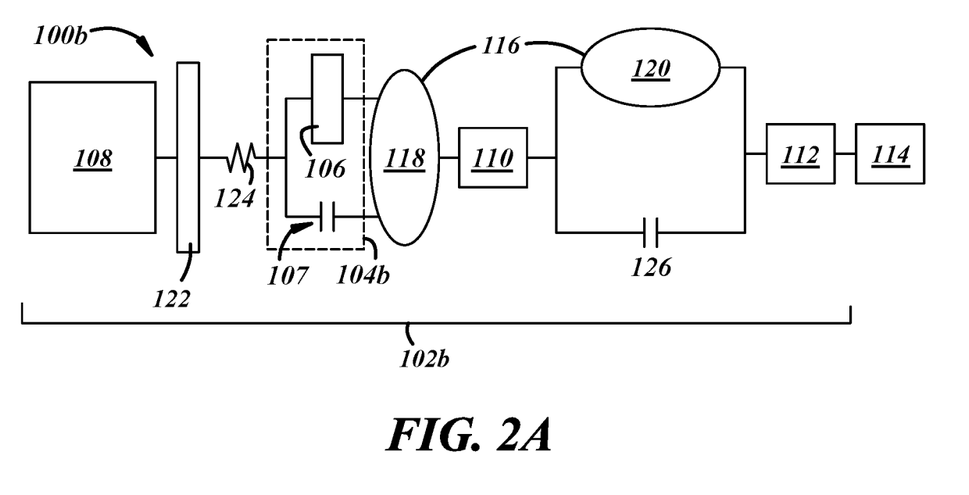
FIG. 2A is a lever diagram depicting a hybrid vehicle and powertrain having a mechanical clutch, according to another example.
Figure 2B:
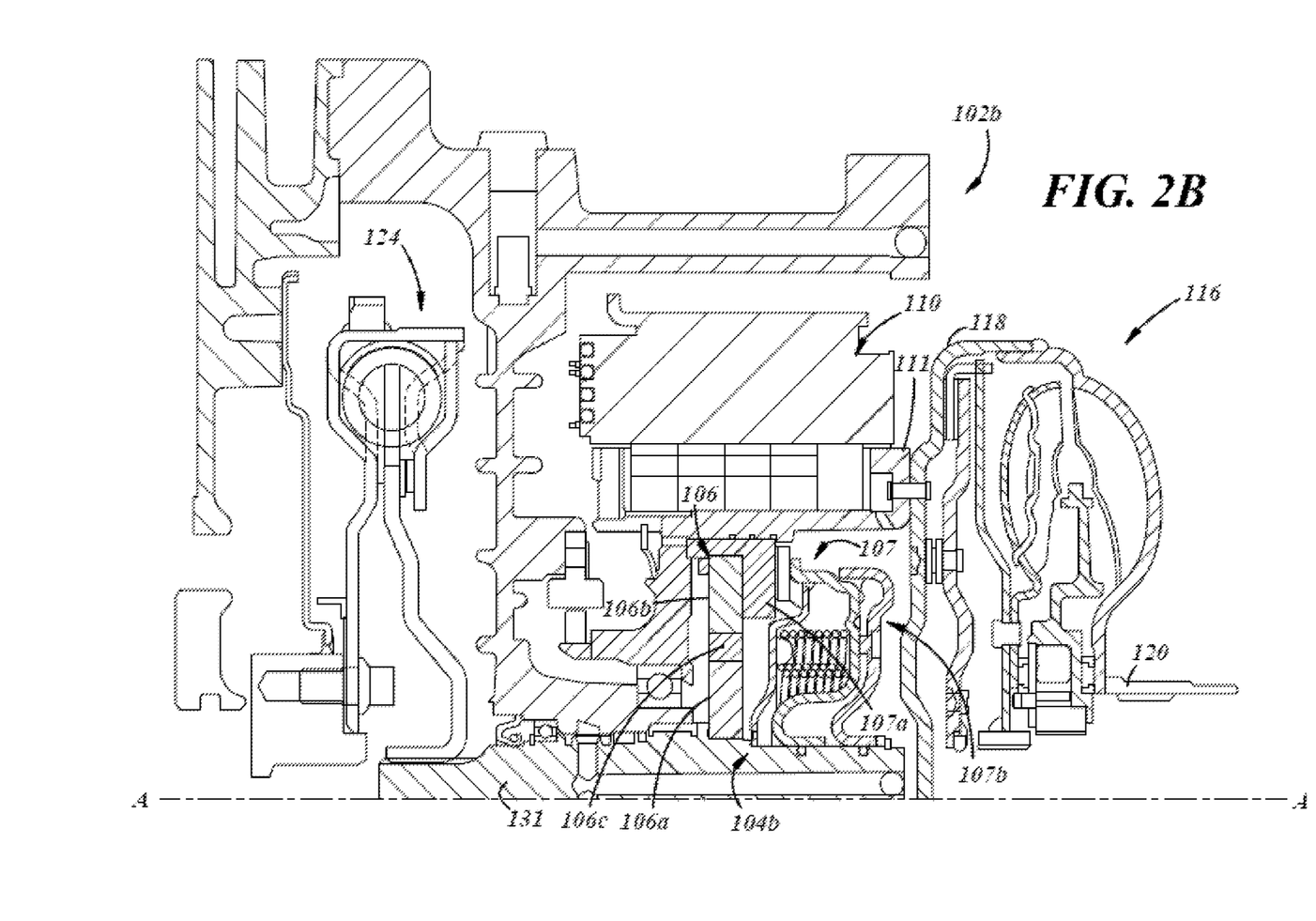
FIG. 2B is a partial section view of the powertrain of FIG. 2A, according to one example.

Turning now to FIGS. 1A-1E, 2A, and 2B, example illustrations of hybrid vehicles and powertrains will be described in further detail. More specifically, FIGS. 1A and 2A are schematic illustrations of a lever diagram for a hybrid vehicle 100a and 100b, respectively (collectively referred to as hybrid vehicle 100). FIGS. 1B and 2B are sectional views of a hybrid powertrain 102a and 102b, respectively (collectively referred to as hybrid powertrain 102). In both of these examples, the powertrain 102 of hybrid vehicle 100 includes a mechanical clutch 104 consistent with the above-discussed advantages. More specifically, the powertrain 102a of vehicle 100a is provided with a mechanical clutch 104a, which is a selectable one-way clutch (SOWC) that will be described further below. The powertrain 102b of vehicle 100b, on the other hand, is provided with a mechanical clutch 104b having a one-way clutch 106 paired with a low-capacity disc clutch 107, each of which will be described further below.

As best seen in the lever diagrams of FIGS. 1A and 2A, example vehicles 100 generally may be driven by an IC engine 108 and motor-generator unit (MGU) 110 in various operating states to provide motive force to a multi-gear transmission 112, which in turn powers a final drive unit 114. More specifically, a vehicle 100 may be driven at any given time (1) exclusively by the IC engine 108, (2) exclusively by the MGU 110, or (3) by each of the IC engine 108 and MGU 110 simultaneously. Example operating states of the vehicles 100a, 100b and advantages of the mechanical clutch 104 will be described further below. The final drive unit 114 may include a differential, axle, or other shaft arrangement for driving one or more wheels of the vehicle 100. In one example, the final drive unit 114 is a front or rear axle of the vehicle 100.

Example illustrations of a powertrain 102 and vehicle 100 herein are generally applicable to any hybrid vehicle employing an IC engine 108 and MGU 110 selectively to provide motive force to drive the vehicle 100. The benefits of the various mechanical clutches may be of particular use in applications where the MGU 110 is relatively powerful and/or is used to provide motive force to a final drive unit 114 of a vehicle. In one example, the MGU 110 is at least a 50 V motor-generator, i.e., having a maximum voltage of at least 50 V.

The transmission 112 may receive motive force or rotational power output by the IC engine 108 and/or MGU 110 by way of a torque converter 116. The torque converter 116 employs a fluid coupling to transmit power and multiply torque received by the transmission 112 from the IC engine 108 and/or MGU 110. More specifically, the torque converter may have a torque converter (TC) cover or pump element 118 driving a turbine 120 by way of a fluid coupling. The torque converter 116 may also have a lockup clutch 126 for selectively locking the cover 118 and turbine 120, e.g., to synchronize rotational speeds of the cover 118 and turbine 120 and eliminate slip across the fluid coupling during certain operating conditions. In examples that will be described further below, a rotor of the MGU 110 may be directly joined to the cover 118 of the torque converter 116, i.e., such that the rotor 111 and cover 118 are always rotating at the same speed or stationary together. The MGU 110 may thereby provide motive force to the torque converter 116, transmission 112, and final drive unit 112, either alternatively or in addition to that provided by the IC engine 108.

The engine 108 may have an output shaft, e.g., a crankshaft, sending rotational power to the mechanical clutch 104. As illustrated in FIGS. 1A and 2A, a flexplate 122 and damper 124 may be provided, which are secured to the crankshaft/output shaft of the IC engine 108, to generally improve noise/vibration/harshness characteristics of the IC engine 108 by reducing transmission of vibration, noise, or other transient excitations from the engine 108 to other elements of the powertrain 102 and/or vehicle 100.

The mechanical clutch 104 of the vehicle 100 generally allows the IC engine 108 to selectively provide power to drive the vehicle 100, either alternatively or in addition to rotational power supplied by the MGU 110, as noted above. As noted above, in one example illustrated in FIGS. 1A-1E, the mechanical clutch may be a selectable one-way clutch (SOWC) 104a. In another example illustrated in FIGS. 2A and 2B, on the other hand, the mechanical clutch 104b may include a one-way clutch 106 and a low-capacity or single-disc clutch 107.

Turning now to FIGS. 1B-1E, the example of the powertrain 102a where the mechanical clutch is a selectable one-way clutch (SOWC) 104a will be discussed in further detail. The IC engine 108 (FIG. 1A) may drive a rotatable shaft 131 in a first rotational direction, as best seen in FIGS. 1B and 1C. The rotatable shaft 131 may be a crankshaft of the engine 108, or a layshaft coupled with the crankshaft of the engine 108 for rotation, e.g., by way of a fixed gearing. The MGU 110 is configured to selectively provide rotational power to a rotational output, which in the example of FIGS. 1B-1E is the torque converter cover 118. More specifically, as best seen in FIG. 1B, the motor-generator 110 includes a rotor 111 that is fixed for rotation with the rotational output 118, e.g., by way of one or more bolts or other mechanical fasteners. The MGU 110 may also generate electrical power to recharge a vehicle battery (not shown), i.e., by the motion of the vehicle being translated into rotational force transferred by way of the final drive unit 114 and transmission 112 to the rotor 111, which is fixed for rotation with the cover 118.

As noted above, the powertrain 102a employs SOWC 104a as an engine disconnect device. The SOWC 104a may selectively lock the rotatable shaft 131 with the rotational output 118 in a first "forward" direction, where (a) the rotatable shaft 131 may drive the rotational output 118 in the first rotational direction, and (b) the rotational output 118 is permitted to freewheel with respect to the rotatable shaft 131 when rotating faster in the first rotational direction than the rotatable shaft 131.

The locking direction of the SOWC 104a may be reversed by way of a selector plate 135. In this second, "reverse" locked position, the rotatable shaft 131 may be driven by the cover 118 in the first direction. In this manner, the IC engine 108 may apply an engine braking force to the cover 118 by way of the rotatable shaft 131. The rotatable shaft 131 may, in this second reverse-locked orientation, freewheel with respect to the cover 118 if it begins to rotate faster than the cover 108 in the first rotational direction, e.g., if the vehicle speed falls low enough that the rotating speed of the shaft 131 is higher than the cover 118.

In a third configuration of the SOWC 104a that will be described further below, the selector plate 135 may be rotated such that the SOWC 104a is both forward-locked and reverse-locked, i.e., the SOWC 104a directly fixes the rotatable shaft 131 to the cover 118. This "forward-locked, reverse-locked" configuration may be used when driving using the engine 108, and it is desired to immediately transmit engine braking forces (e.g., if the engine is coasting) or engine driving forces (e.g., if the driver is demanding acceleration of the vehicle) from the rotatable shaft 131 to the cover 118.

Selective locking of the SOWC 104a in the various forward-locked and reverse-locked orientations may be initiated by the selector plate 135. More specifically, the selector plate 135 may be used to selectively couple or decouple two rotational members 125, 130 of the SOWC 104a by way of struts, rockers, rollers, pawls, wedges, or sprags, merely as examples. Accordingly, the SOWC 104a may be any type of selectable one-way clutch that is convenient.

As best seen in FIG. 1C, a first one of the rotational members 125 may be fixed for rotation with the rotor 111 of the MGU 110 and the cover 118, e.g., by way of splines or the like. Similarly, the second rotational member 130 may be fixed for rotation with the rotatable shaft 131, e.g., by way of splines or the like. The first and second rotatable members 125, 130 may be rotated relative to one another, except when engaged with each other by way of engagement elements as will be discussed further below.

In FIG. 1D, the example SOWC 104a is illustrated in a forward-locked, reverse-freewheeling configuration, while a reverse-locked, forward freewheeling configuration is shown in FIG. 1E. The first member 125 and the second member 130 may be placed into either configuration with the selector plate 135, as noted above. More specifically, the selector plate 135 includes a selector plate actuation feature 140 that facilitates movement of a first engagement or locking element 150 and a second engagement or locking element 155 from respective engagement cavities 151 and 156 formed in the rotational member 130 to selectively engage and disengage from corresponding engagement features 170 formed in the rotational member 125. For example, the angular orientation of the selector plate 135 may be changed relative to the second rotational member 130, thereby selectively allowing the engagement elements 150, 155 to be forced into their respective engagement features 170 of the rotational member 125 by their respective return springs 160. Thus, the first member 125 and the selector plate 135 can be rotatable features centered around a common axis of rotation A-A (established by the rotatable shaft 131 shown in FIG. 1B). The members 125 and 130 may be flat circular plates, which are shown in partial section in FIGS. 1D and 1E.

As shown in FIGS. 1D and 1E, the selector plate 135 is sandwiched between the two members 125, 130 and may generally move or remain fixed with first member 125. Selector plate 135 is movable relative to second member 130 by some small rotational angle by way of an actuator 133 (see FIG. 1C), so as to provide calibrated movement of selector plate actuation feature 140. The actuator 133 may be a solenoid, hydraulic actuator, pin, or any other device convenient for effecting rotation of the selector plate 135 relative to the member 130. Engaging elements 150 and 155, illustrated as struts in this example, are rotatingly located in corresponding cavities 151 and 156, respectively, of the second member 130, are oriented substantially normally to the radius of the member 130, and provide the selective coupling and decoupling functions served by the SOWC 104a. Each engaging element, when in an "up" position, fixedly fits against the engagement feature 170 in first member 125 and prevents second member 130 from rotating relative to first member 125 in one direction. The engagement elements 150, 155 are biased into the up position due to forces exerted by return springs 160. Selector plate 135 can be actuated relative to the engaging elements, such that selector plate actuation feature 140 can be used to depress one of the engagement elements 150, 155 into a down position. The action of the engagement features 150, 155 to stop relative rotation depends upon the geometry of the interacting features. If one of the engagement elements 150, 155 is in a down position, then the SOWC 104a can freewheel in the direction normally prohibited by the engagement feature in the down position. While one engagement feature 150, 155 is disclosed herein corresponding to each of the forward-locked/reverse-freewheeling and reverse-locked/forward freewheeling configurations, a plurality of engagement features 150, 155 may be provided about the perimeter of the rotational members 125, 130.

FIG. 1D illustrates SOWC 104a with one engagement element 150 in a down position and one engagement element 155 in an up position. Engagement element 155 is in an up position and is fit against an engagement feature 170. As a result, second member 130 cannot rotate to the right relative to first member 125, thereby allowing the shaft 131 (FIG. 1B) to drive the first member 125 by way of the second member 130 in this first configuration. It should also be noted that engagement element 150 is in a down position, and engagement feature 155 provides substantially zero resistance to second member 130 rotating to the left relative to first member 125 in FIG. 1D. Accordingly, when relative rotation occurs and first member 125 moves to the right, coming into contact with engagement element 155, pressure upon the top, nearly horizontal surface of engagement element 155 creates a downward rotation of engagement element 155. This ratcheting motion of engagement element 155 can continue as the first member 125 rotates past subsequent engagement features 155. The state of the SOWC 104 in FIG. 1D is consistent with the selection of the forward-locked/reverse-freewheeling configuration of the SOWC 104a. Accordingly, the second member 130 may freewheel with respect to the first member 125, e.g., if rotating speed of the shaft 131 in the first direction falls below that of the first member 125. In the forward-locked, reverse-freewheel configuration, the powertrain 102a may use the engine 108 to provide rotational power to drive the vehicle, either alone or in combination with that provided by the MGU 110 (which inputs rotational power by way of the rotor 111, which is fixed to the cover 118 of the torque converter 116).

FIG. 1E illustrates SOWC 104a with the orientation of the engagement elements 150, 155 essentially reversed with respect to the orientation illustrated in FIG. 1D. More specifically, one engagement element 155 is in a down position and one engagement element 150 is in an up position. Engagement element 150 is in an up position and is fit against an engagement feature 170. As a result, first member 125 cannot rotate to the right relative to second member 130, thereby allowing the shaft 131 (FIG. 1B) to slow the first member 125, i.e., by using engine braking from the engine 108. At the same time, as shown in FIG. 1E engagement element 155 is in a down position, and engagement feature 150 provides substantially zero resistance to second member 130 rotating to the right relative to first member 125 in FIG. 1E. Accordingly, when relative rotation occurs and first member 125 comes into contact with engagement element 150, pressure upon the top, nearly horizontal surface of engagement element 150 creates a downward rotation of engagement element 150. This ratcheting motion of engagement element 150 can continue as the first member 125 rotates (i.e., moving to the left relative to second member 130 in FIG. 1E) past subsequent engagement features 150. The state of the SOWC 104a in FIG. 1E is consistent with the selection of the reverse-locked/forward-freewheeling configuration of the SOWC 104a. Accordingly, the second member 130 may apply an engine braking force from the engine 108 (not shown in FIG. 1E), slowing the vehicle 100a by way of the shaft 131. In the reverse-locked, forward-freewheel configuration, then, the powertrain 102a may use the engine 108 to slow the vehicle 100a. The MGU 110 may additionally generate electrical power by way of the cover 118 driving the rotor 111, e.g., to recharge vehicle batteries.

In a third configuration, as noted above the selector plate 135 may be rotated to a position intermediate those shown in FIGS. 1D and 1E, such that the selector plate actuation feature 140 does not overly either of the engagement elements 150, 155. Accordingly, each of the engagement elements 150, 155 may be allowed to protrude into the corresponding engagement features 170 in response to their respective return spring 160. In such configuration, the SOWC 104a is both forward-locked and reverse-locked, i.e., the SOWC 104a directly fixes the rotatable members 125 and 120 (and, in turn, the rotatable shaft 131 and the cover 118) for rotation together. This "forward-locked, reverse-locked" configuration may be used when driving using the engine 108 (either alone or in combination with the MGU 110), and it is desired to immediately transmit engine braking forces (e.g., if the engine is coasting) or engine driving forces (e.g., if the driver is demanding acceleration of the vehicle) from the rotatable shaft 131 to the cover 118.

The selector plate 135, accordingly, may rotate relative to the rotational member 125 moving the selector plate engagement feature 140 to allow engagement element 150, engagement elements 155, or both of the engagement elements 150, 155 to protrude into the respective engagement feature 170 of the rotational member 130, thereby selectively placing the SOWC 104a into any of the three configurations discussed above.

The members of a mechanical clutch such as SOWC 104a are likely to have a plurality of features like engagement elements 150, 155, each actuated similarly to allow or prevent rotation in either direction, with the total torque transmitted through the SOWC 104a distributed between the features thereof. Similar SOWC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

In another example illustration shown in FIGS. 2A and 2B, a mechanical clutch may be provided in the form of a mechanical clutch assembly 104b comprising a one-way clutch 106 and a low-capacity or single-disc clutch 107. Referring now to FIG. 2B, a one-way clutch 106 may be implemented by way of a roller clutch, sprag clutch, or any other mechanical clutch that generally allows the shaft 131 to drive the cover 118 and rotor 111 in a first rotational direction, while freely allowing relative rotation between the shaft 131 and rotor 111 in the opposite rotational direction. Merely as one example, the one-way clutch 106 may have a first radial member 106a fixed for rotation with shaft 131, and a second radial member 106b positioned radially outwardly of the first radial member 106b. The second radial member 106b is fixed for rotation with the rotor 111 (and, by extension, the cover 118). One or more engagement elements such as roller elements 106c, which may be rollers, sprags, or the like, may be positioned between the first and second radial members 106a, 106b. The one-way clutch 106 may be configured such that the roller elements 106c lock the second radial member 106b to the first radial member 106a for rotation with the first radial member 106a in a first direction coinciding with driving of the engine 108. Accordingly, the one-way clutch 106 may be implemented such that the engine 108 can drive the cover 118 in a first direction by way of the first radial member 106a turning the second radial member 106b. At the same time, should speed of the engine 108 be reduced such that rotational speed of the shaft 131 falls below the rotational speed of the cover 118, e.g., upon coasting by the driver, the one-way clutch 106 permits the cover 118 to freewheel with respect to the shaft 131. More specifically, the roller elements 106c permit the second radial member 106b to freewheel with respect to the first radial member 106a.

The example illustrated in FIGS. 2A and 2B also includes a low-capacity or single disc clutch 107, which allows for an engine braking force to be selectively applied by the engine 108 to the cover 118 via the shaft 131. The low-capacity clutch may have relatively fewer friction discs as compared with a traditional wet disconnect clutch, for example a single friction disc 107a fixed for rotation with the rotor 111 as best seen in FIG. 2B. The lower capacity of the disc clutch 107 may be acceptable given the comparatively lower forces applied by engine braking to the cover 118 (as compared with driving forces imparted by the engine 108 via the one-way clutch 106 to the cover 118). A piston 107b may be fixed for rotation with the shaft 131 and engage the friction disc 107a when it is desired to apply a braking force from the engine 108 to the cover 118 (and, by extension to the transmission 112 and final drive unit 114).

Application of a mechanical clutch in an engine disconnect device, e.g., as described above with the SOWC 104a and mechanical clutch assembly 104b, can reduce parts and packaging space of the clutch, improve drivability, and reduce fuel consumption. For example, the freewheeling allowed by the SOWC 104a and one-way clutch 106 is generally instantaneous when relative rotation occurs between the rotational members thereof, which may be particularly beneficial when the engine is transitioning from a driving state to a coasting or idling or non-running state. Additionally, drag of a mechanical clutch such as SOWC 104a is relatively low, and re-engagement of the rotating members upon restarting or acceleration of engine speed is nearly instantaneous (as distinguished from the relatively slower and more imprecise engagement typical of a wet disconnect clutch). Merely by way of example, in an operating state where the engine 108 is driving the vehicle 100 (either alone or in addition to the MGU 110) and the driver reduces input from an accelerator to the engine 108 (i.e., to coast), a first rotational member of SOWC 104a or one-way clutch 106 (linked to vehicle speed via rotation of the torque converter cover 118) may freewheel with respect to the other rotational member (which is linked to engine speed by way of the shaft 131) with little drag. In one example, a mechanical clutch such as that described herein may have a drag of 0.1-0.2 Newton-meters (Nm), compared to 0.5-0.7 Nm drag typical of a wet disconnect clutch. The generally instantaneous freewheel allowed by the SOWC 104a and one-way clutch 106 and low drag improves drivability by reducing reaction forces transmitted through the powertrain 102, and by reducing frictional losses due to drag. Additionally, should the driver wish to again accelerate the vehicle 100 with the engine 108, the reengagement of the rotational members of the SOWC 104a and one-way clutch 106 is almost instantaneous. For example, the return springs 160 of the SOWC 104a urge the engagement member 155 into the engagement feature 170 of the first member 125 upon the relatively slight rotational movement of the second rotational member 130 relative to the first rotational member 125. By comparison, re-engagement of a wet disconnect clutch may require a buildup of hydraulic pressure upon a friction disc or the like. If this buildup of pressure is too slow, engagement of the wet disconnect clutch is delayed and engine speed may initially flare or overshoot that of the torque converter cover 118. On the other hand, if pressure builds too quickly, the engine speed may be undesirably reduced by the engagement of the wet disconnect clutch at too low of an engine speed.

The vehicle 100 may be driven by the IC engine 108 and MGU 110, either together or in alternative fashion. For example, in an engine-only operating state, upon demand by the driver (e.g., pressing down on an accelerator), the IC engine 108 is turning the shaft 131 and driving the torque converter cover 118 by way of the SOWC 104a or one-way clutch 106. At the same time, the rotor 111 is being rotated (and may thus generate electrical power) as a result of being connected to the cover 118. Upon coasting or slowing of the vehicle, the engine 108 may apply engine braking forces by way of the shaft 131—in the example of the SOWC 104a, the configuration is reversed to the reverse-locked/forward-freewheeling configuration, such that the IC engine 108 slows down the spinning cover 118 and rotor 111

In another operating state where the IC engine 108 is assisted by the MGU 110, under a demand by the driver for acceleration of the vehicle 100, the IC engine 108 (and MGU 110) may provide driving power to the cover 118. When coasting, if the engine speed slows down, no engine braking is applied to the cover 118 or MGU 110 due to the freewheeling permitted by the SOWC 104a or one-way clutch 106. Accordingly, the MGU 110 can get the full benefit of regenerative braking, as the rotor 111 is directly connected to the cover 118 (and can thereby apply engine braking force to the transmission 112 and final driver unit 114). Alternatively, the SOWC 104a configuration may be reversed (i.e., to the reverse-locked, forward-freewheeling configuration) or the low-capacity clutch 107 of the mechanical clutch assembly 104b may be actuated, thereby permitting the use of engine braking to slow the vehicle.

In still another "electric-only" operating mode of the vehicle 100, the IC engine 108 may be stopped entirely while the vehicle 100 is driven by the MGU 110. The freewheeling of the SOWC 104a or the one-way clutch 106 may allow the rotor 111 of MGU 110 and the cover 118 to spin substantially freely with respect to the shaft 131 associated with the engine 108. When there is a further demand for acceleration of the vehicle in this electric-only mode, the rotor 111 spinning with the cover 118 drives the engine free of interference or drag from the engine 108, which remains stopped or idling.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A hybrid vehicle, comprising:
   a final drive unit driving at least one vehicle wheel; and
   a powertrain providing motive force to the final drive unit, the powertrain including:
   an internal combustion engine configured to provide rotational power to a rotatable shaft in a first rotational direction;
   an electric motor-generator comprising a rotor fixed for rotation with a torque converter rotational input, such that the electric motor-generator is configured to selectively provide rotational power to the torque converter rotational input; and
   an engine disconnect device comprising a mechanical clutch linking the rotatable shaft with the torque converter rotational input such that the rotatable shaft drives the torque converter rotational input in the first rotational direction, and the torque converter rotational input freewheels with respect to the rotatable shaft when rotating faster in the first rotational direction than the rotatable shaft;
   wherein the mechanical clutch is a selectable one-way clutch, the selectable one-way clutch linking the rotatable shaft with the torque converter rotational input such that the rotatable shaft freewheels with respect to the torque converter rotational input when rotating faster than the torque converter rotational input in the first rotational direction, and the selectable one-way clutch is configured to apply an engine braking force transmitted by the rotatable shaft to the torque converter rotational input; and
   wherein the selectable one-way clutch includes one or more axial engagement elements configured to transmit rotational power from the rotatable shaft to the torque converter rotational input.

2. The hybrid vehicle of claim 1, wherein the selectable one-way clutch includes a selector plate configured to selectively actuate the selectable one-way clutch between a first configuration that is forward-locked and reverse-locked, and a second configuration that is forward-locked and reverse-freewheel.

3. The hybrid vehicle of claim 1, wherein the selectable one-way clutch includes at least one rotational member having the one or more axial engagement elements disposed within engagement element cavities of the at least one rotational member, the one or more engagement elements pivotable between a locked position and a freewheel position.

4. The hybrid vehicle of claim 3, wherein the at least one rotational member is configured to drive a corresponding rotational member in the first rotational direction when the one or more axial engagement elements are in the locked position.

5. The hybrid vehicle of claim 3, wherein the one or more axial engagement elements are pivotable about an axis perpendicular to an axis of rotation of the at least one rotational member.

6. The hybrid vehicle of claim 1, wherein the final drive unit includes a rear axle of the vehicle.

7. The hybrid vehicle of claim 1, wherein the electric motor-generator has a maximum voltage greater than 50 Volts (V).

8. A hybrid powertrain, comprising:
   an internal combustion engine configured to provide rotational power to a rotatable shaft in a first rotational direction;
   an electric motor-generator comprising a rotor fixed for rotation with a torque converter rotational input, such that the electric motor-generator is configured to selectively provide rotational power to the torque converter rotational input; and
   an engine disconnect device comprising a mechanical clutch linking the rotatable shaft with the torque converter rotational input such that the rotatable shaft drives the torque converter rotational input in the first rotational direction, and the torque converter rotational input freewheels with respect to the rotatable shaft when rotating faster in the first rotational direction than the rotatable shaft;
   wherein the mechanical clutch is a selectable one-way clutch, the selectable one-way clutch linking the rotatable shaft with the torque converter rotational input such that the rotatable shaft freewheels with respect to the torque converter rotational input when rotating faster than the torque converter rotational input in the first rotational direction, and the selectable one-way clutch is configured to apply an engine braking force transmitted by the rotatable shaft to the torque converter rotational input; and wherein the selectable one-way clutch includes one or more axial engagement elements configured to transmit rotational power from the rotatable shaft to the torque converter rotational input.

9. The hybrid powertrain of claim 8, wherein the selectable one-way clutch includes a selector plate configured to selectively actuate the selectable one-way clutch between a first configuration that is forward-locked and reverse-locked, and a second configuration that is forward-locked and reverse-freewheel.

10. The hybrid powertrain of claim 8, wherein the selectable one-way clutch includes at least one rotational member having the one or more axial engagement elements disposed within engagement element cavities of the at least one rotational member, the one or more axial engagement elements pivotable between a locked position and a freewheel position.

11. The hybrid powertrain of claim 10, wherein the at least one rotational member is configured to drive a corresponding rotational member in the first rotational direction when the one or more axial engagement elements are in the locked position.

12. The hybrid powertrain of claim 10, wherein the one or more axial engagement elements are pivotable about an axis perpendicular to an axis of rotation of the at least one rotational member.

13. The hybrid powertrain of claim 8, wherein the electric motor-generator has a maximum voltage greater than 50 Volts (V).

* * * * *